(12) United States Patent
Shimo et al.

(10) Patent No.: US 9,212,615 B2
(45) Date of Patent: Dec. 15, 2015

(54) START CONTROL DEVICE OF COMPRESSION SELF-IGNITION ENGINE

(71) Applicant: Mazda Motor Corporation, Aki-gun, Hiroshima (JP)

(72) Inventors: Daisuke Shimo, Hiroshima (JP); Yoshihisa Nakamoto, Hiroshima (JP); Takeo Yamauchi, Aki-gun (JP); Junichi Taga, Higashihiroshima (JP); Kenta Kobayashi, Hiroshima (JP); Masahiro Miyazaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 612 days.

(21) Appl. No.: 13/649,055

(22) Filed: Oct. 10, 2012

(65) Prior Publication Data

US 2013/0138328 A1   May 30, 2013

(30) Foreign Application Priority Data

Nov. 25, 2011  (JP) .................................. 2011-258187

(51) Int. Cl.
| F02D 41/00 | (2006.01) |
| F02D 41/06 | (2006.01) |
| F02D 41/36 | (2006.01) |
| F02D 41/40 | (2006.01) |

(52) U.S. Cl.
CPC ............ *F02D 41/062* (2013.01); *F02D 35/024* (2013.01); *F02D 35/026* (2013.01); *F02D 41/403* (2013.01); *F02D 2041/0095* (2013.01);
(Continued)

(58) Field of Classification Search
CPC ... F02D 41/009; F02D 41/403; F02D 41/065; F02D 2041/0095; F02D 2200/021; F02D 41/00; F02D 41/06; F02D 41/36; F02D 41/40; F02N 2019/008; F02N 11/0814; F02N 99/006; F02N 11/08; F02N 19/00; F02N 2019/002; F02N 2300/2002; Y02T 10/44
USPC ........ 123/179.4, 198 F, 481, 436, 491, 179.3, 123/179.16, 299, 300, 305, 112, 103, 113
See application file for complete search history.

(56) References Cited

U.S. PATENT DOCUMENTS

| 2004/0103874 A1* | 6/2004 | Takahashi ...................... 123/299 |
| 2005/0211227 A1* | 9/2005 | Mizutani ........................ 123/491 |

(Continued)

FOREIGN PATENT DOCUMENTS

JP            2009062960            3/2009

*Primary Examiner* — Hai Huynh
*Assistant Examiner* — Raza Najmuddin
(74) *Attorney, Agent, or Firm* — Alleman Hall McCoy Russell & Tuttle LLP

(57) ABSTRACT

A start control device of a compression self-ignition engine is provided. The device includes: a determining module for determining whether a piston of a compression-stroke-in-stop cylinder that is stopped on a compression stroke according to an automatic stop is within a specific range set on a bottom dead center side of a predetermined reference stop position; an injection control module for controlling each fuel injection valve to inject fuel into the compression-stroke-in-stop cylinder first after the piston of the compression-stroke-in-stop cylinder is determined to be stopped within the specific range and the engine restart condition is satisfied; and an in-cylinder pressure estimating module for estimating an in-cylinder pressure of the compression-stroke-in-stop cylinder at a first top dead center on the compression stroke in the restart, where the piston of the compression-stroke-in-stop cylinder reaches after the restart starts.

8 Claims, 11 Drawing Sheets

(51) Int. Cl.
  *F02D 35/02* (2006.01)
  *F02N 19/00* (2010.01)
  *F02N 11/08* (2006.01)
(52) U.S. Cl.
  CPC ....... *F02N 11/0814* (2013.01); *F02N 2019/002* (2013.01); *Y02T 10/44* (2013.01)

(56) References Cited

U.S. PATENT DOCUMENTS

2007/0245982 A1\* 10/2007 Sturman ..................... 123/26
2012/0042849 A1\* 2/2012 Sangkyu et al. .............. 123/294

\* cited by examiner

START CONTROL DEVICE OF COMPRESSION SELF-IGNITION ENGINE

BACKGROUND

The present invention relates to a start control device provided to a compression self-ignition engine for combusting, by self-ignition, fuel injected from a fuel injection valve into a cylinder. The start control device automatically stops the engine when a predetermined automatic stop condition is satisfied, and when a predetermined restart condition is satisfied, restarts the engine by injecting the fuel from the fuel injection valve while applying a torque to the engine by using a starter motor.

In recent years, compression self-ignition engines represented by diesel engines have become widely known as in-vehicle engines for reasons of their generally excellent thermal efficiency and reduced discharge amount of $CO_2$ compared to spark-ignition engines, such as gasoline engines.

For a larger reduction of $CO_2$ in such compression self-ignition engines, it is effective to adopt the art of a so-called idle stop control of automatically stopping the engine under an idle drive and then restarting the engine when a starting operation of the vehicle is performed. Various studies relating to this have been performed.

For example, JP2009-062960A discloses a control device of a diesel engine that stops the diesel engine when a predetermined automatic stop condition is satisfied, and when a predetermined restart condition is satisfied, restarts the diesel engine by injecting fuel while driving a starter motor. With the control device, a cylinder to which the fuel is injected first is changeably set based on a stop position of a piston of a cylinder that stops on a compression stroke (compression-stroke-in-stop cylinder).

Specifically, in JP2009-062960A, when the diesel engine is automatically stopped, the stop position of the piston of the compression-stroke-in-stop cylinder that is on the compression stroke at the time is obtained, and it is determined whether the piston stop position is an appropriate position set relatively on a bottom dead center (BDC) side. When the piston stop position is the appropriate position, the fuel is injected into the compression-stroke-in-stop cylinder first so as to restart the combustion when the engine overall reaches a top dead center on compression stroke (compression TDC) for the first time in the restart (hereinafter, referred to as "the first compression start").

On the other hand, when the piston of the compression-stroke-in-stop cylinder is on the TDC side of the appropriate position, the fuel is injected into a cylinder that is stopped on an intake stroke (intake-stroke-in-stop cylinder) when the cylinder shifts to the compression stroke so as to restart the combustion when the engine overall reaches the compression TDC for the second time in the restart (hereinafter, referred to as "the second compression start"). The second compression start in which the fuel is injected into the intake-stroke-in-stop cylinder instead of the compression-stroke-in-stop cylinder is because, when the piston of the compression-stroke-in-stop cylinder is on the TDC side of the appropriate position, a compression margin (stroke amount to the TDC) of the piston is small and air inside the cylinder does not increase sufficiently, causing a possible misfire even if the fuel is injected into the compression-stroke-in-stop cylinder.

With the art of JP2009-062960A, although the engine can be restarted promptly by the first compression start when the piston of the compression-stroke-in-stop cylinder is at the appropriate position, the second compression start is required when the piston is on the TDC side of the appropriate position, and it takes a long time to restart the engine. Thus, in the second compression start, because the fuel is injected after the intake-stroke-in-stop cylinder shifts to the compression stroke, energy generated by the combustion cannot be used until the engine overall reaches the compression TDC the second time in the restart, and a restart time period accordingly becomes long. Therefore, it has been desired to enable an engine restart by the first compression start as frequent as possible.

SUMMARY

The present invention is made in view of the above situations, and provides a restart control device of a compression self-ignition engine that can increase an opportunity of promptly restarting the engine by the first compression start by performing an appropriate fuel injection control according to an in-cylinder environment.

According to one aspect of the invention, a start control device including a compression self-ignition engine, fuel injection valves for injecting fuel into cylinders of the engine respectively, a piston stop position detector for detecting stop positions of pistons, and a starter motor for applying a rotational force to the engine is provided. The engine combusts through a self-ignition, the fuel injected into the cylinders by the fuel injection valves. The device automatically stops the engine when a predetermined automatic stop condition is satisfied, and thereafter, when a predetermined restart condition is satisfied, restarts the engine by injecting the fuel while applying the rotational force to the engine. The device includes: a determining module for determining whether a piston of a compression-stroke-in-stop cylinder that is stopped on the compression stroke according to the automatic stop is within a specific range set on a bottom dead center side of a predetermined reference stop position; an injection control module for controlling each of the fuel injection valves to inject the fuel into the compression-stroke-in-stop cylinder first after the piston of the compression-stroke-in-stop cylinder is determined to be stopped within the specific range and the engine restart condition is satisfied; and an in-cylinder pressure estimating module for estimating an in-cylinder pressure of the compression-stroke-in-stop cylinder at a first top dead center on the compression stroke in the restart, where the piston of the compression-stroke-in-stop cylinder reaches after the restart starts. Each of the pistons is formed with a cavity in a predetermined part of its crown surface facing the fuel injection valve, the cavity being recessed with respect to other parts of the crown surface. The injection control module performs, at least as the first fuel injection to the compression-stroke-in-stop cylinder, a main injection for causing a main combustion so that a heat release rate reaches its peak after the compression TDC, and a pre-injection for causing a pre-combustion so that the heat release rate reaches its peak before the main injection starts. The pre-injection is performed once or more at such timings that the injected fuel falls within the cavity of the piston, and the number of pre-injections is increased and an injection amount per single pre-injection is set less as the in-cylinder pressure at the first compression TDC is lower.

According to this configuration, after the engine is automatically stopped, in the first compression start in which the engine is restarted by the fuel injections to the compression-stroke-in-stop cylinder, first the one or more pre-injections are performed at such timings that the fuel falls within the cavity formed in the crown surface of the piston, and the main injection is performed thereafter. Because, by the pre-injection(s), comparatively rich mixture gas is formed within the cavity of the piston and the mixture gas self-ignites to combust itself after the predetermined retarded time length (pre-combustion), when the in-cylinder temperature and pressure of the compression-stroke-in-stop cylinder increase and the main injection is performed subsequently, the injected fuel self-ignites to combust itself (main combustion) soon after the injection. In the main combustion, because the heat release rate reaches its peak after the compression TDC and it acts to depress the piston after passing the compression TDC, the torque in the positive direction is applied to the engine, and the engine speed is increased.

Thus, the ignitability of the fuel injected in the main injection is improved by the pre-injection(s) (pre-combustion) before the main injection. Therefore, the combustion in the compression-stroke-in-stop cylinder is surely performed even if the compression margin (stroke amount to the TDC) by the compression-stroke-in-stop cylinder is not as large. In this manner, the specific range that is the piston stop position range in which the first compression start is available can be extended toward the TDC. Therefore, the opportunity of performing the first compression start increases and a prompt starting performance can be secured.

Moreover, in this aspect of the invention, the in-cylinder pressure at the first compression TDC is estimated, and the number of pre-injections is increased (the injection amount per single pre-injection is reduced) as the estimated in-cylinder pressure is lower. Therefore, the penetration per single pre-injection can be weakened as the in-cylinder pressure is lower. In this manner, the injection of the fuel with strong penetration even with the low in-cylinder pressure (and an easy fuel diffusion caused thereby) can be avoided. Therefore, the mixture gas that is rich and easily ignites itself can surely be formed within the cavity, and the ignitability of the pre-injected fuel can be secured satisfactorily.

The in-cylinder pressure estimating module may estimate the in-cylinder pressure at the first compression TDC based on the piston stop position of the compression-stroke-in-stop cylinder, an engine stop period of time that is an elapsed period of time from when the engine is completely stopped until the restart condition is satisfied, a coolant temperature of the engine, and an atmospheric pressure.

According to this configuration, the in-cylinder pressure at the first compression TDC can appropriately be estimated based on the piston stop position of the compression-stroke-in-stop cylinder, the engine stop time period, etc.

The injection control module may changeably set the number of pre-injections between two and five.

According to this configuration, the penetration of the pre-injection can be adjusted in a sufficiently wide range. Therefore, the ignitability of the pre-injected fuel can be secured satisfactorily regardless of the in-cylinder pressure at the first compression TDC.

The compression self-ignition engine may be a diesel engine of which a geometric compression ratio is set between 12:1 and below 16:1.

The configuration of the present invention in which the ignitability in the restart is improved by the pre-injection(s) is applicable to a diesel engine of which the geometric compression ratio is 16:1 or below because it has a lower compression ratio and worse ignitability compared to the conventionally used diesel engines.

DETAILED DESCRIPTION OF THE EMBODIMENTS (1) Overall Configuration of Engine

Figure 1:
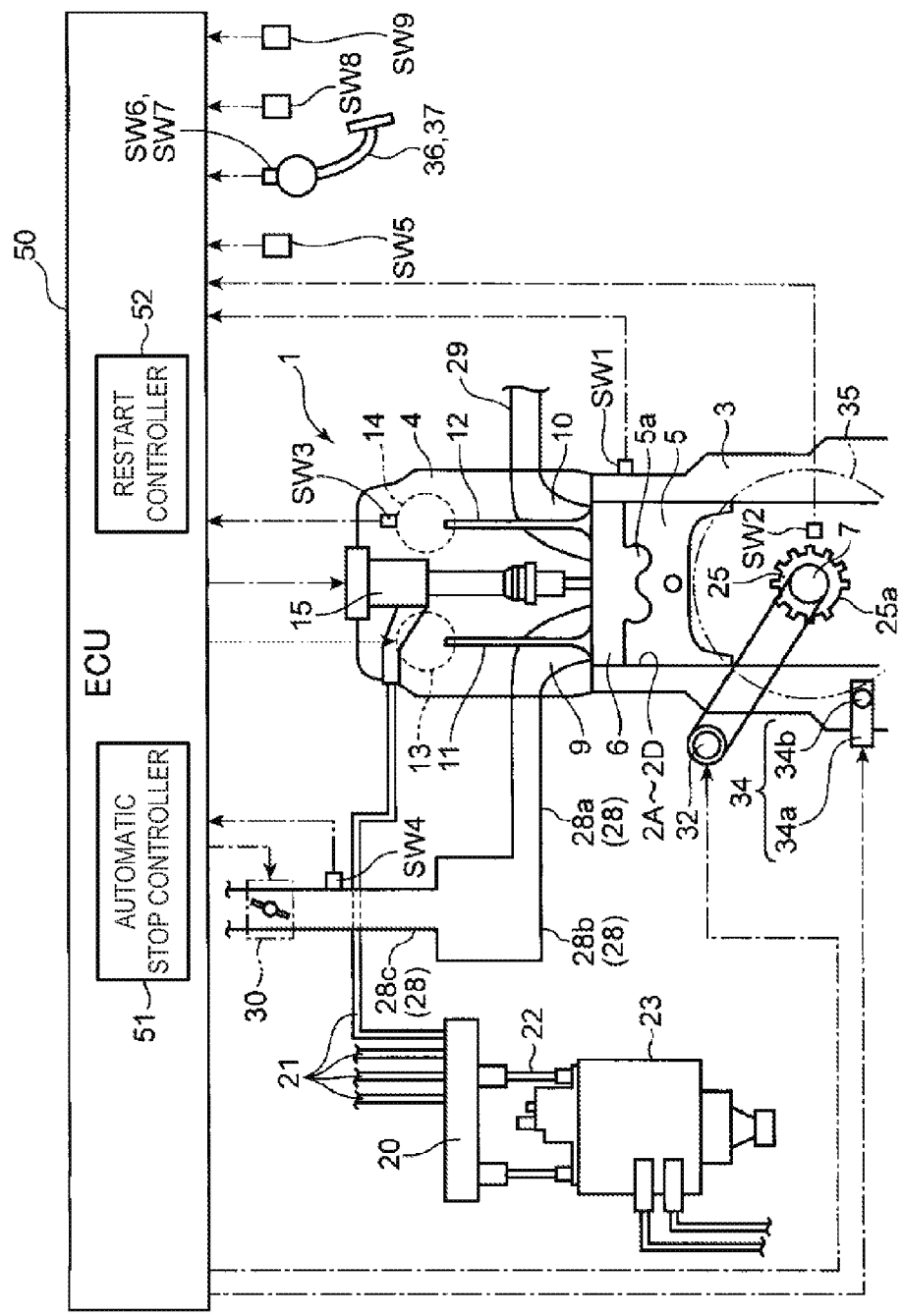
FIG. 1 is a diagram illustrating an overall configuration of a diesel engine applied with a start control device according to one embodiment of the invention.

FIG. 1 is a diagram showing an overall configuration of a diesel engine applied with a start control device according to one embodiment of the invention. The diesel engine shown in FIG. 1 is a four cycle diesel engine mounted in a vehicle as a power source for travel driving. An engine body 1 of the engine is an inline four cylinder type and includes a cylinder block 3 having four cylinders 2A to 2D aligning in a direction where the cylinders overlap with each other in FIG. 1, a cylinder head 4 disposed on the top of the cylinder block 3, and pistons 5 reciprocatably fitted into the cylinders 2A to 2D, respectively.

A combustion chamber 6 is formed above each piston 5, and each combustion chamber 6 is supplied with diesel oil as fuel by an injection from a fuel injection valve 15 (described later). Further, the injected fuel self-ignites in the combustion chamber 6 where temperature and pressure are high because of a compression operation by the piston 5 (compression self-ignites), and the piston 5 is depressed by an expansive force due to the combustion caused by the ignition and reciprocatably moves in a vertical direction.

Each piston 5 is coupled to a crankshaft 7 via a connecting rod (arranged outside the range of FIG. 1), and the crankshaft 7 rotates about its central axis according to the reciprocation movements (vertical movements) of the pistons 5.

Here, in the four-cycle four-cylinder diesel engine, the pistons 5 provided in the cylinders 2A to 2D vertically move with a phase difference of 180° (180°CA) in crank angle. Therefore, timings of combustions (fuel injections for the combustions) in the cylinders 2A to 2D are set to vary the phase by 180°CA from each other. Specifically, when the cylinders 2A to 2D are numbered 1 to 4, respectively, the combustion is performed in the order of the first cylinder 2A, the third cylinder 2C, the fourth cylinder 2D, and then the second cylinder 2B. Therefore, for example, when the first cylinder 2A is on expansion (EXP) stroke, the third cylinder 2C, the fourth cylinder 2D, and the second cylinder 2B are on compression (CMP) stroke, intake (IN) stroke, and exhaust (EX) stroke, respectively.

The cylinder head 4 is provided with intake and exhaust ports 9 and 10 for opening in the combustion chambers 6 of the cylinders 2A to 2D, and intake and exhaust valves 11 and 12 for opening and closing the ports 9 and 10, respectively. Note that, the intake and exhaust valves 11 and 12 are opened and closed by valve operating mechanisms 13 and 14 which respectively include a pair of camshafts arranged in the cylinder head 4, in conjunction with the rotation of the crankshaft 7.

Further, the cylinder head 4 is provided with one fuel injection valve 15 for each of the cylinders 2A to 2D, and each fuel injection valve 15 is connected with a common rail 20 serving as an accumulating chamber, via a branched tube 21. The common rail 20 is accumulated with the fuel (diesel oil) supplied from a fuel supply pump 23 via a fuel supply tube 22 in high pressure, and the fuel, highly pressurized inside the common rail 20, is supplied to each fuel injection valve 15 via the branched tube 21.

Each fuel injection valve 15 is a multi hole type formed with a plurality of holes in its tip, and a fuel passage leading to the holes is formed and a needle valve body for being electromagnetically operated to open and close the fuel passage is provided inside the fuel injection valve 15 (neither is illustrated). Further, by driving the valve body in an opening direction by using the electromagnetic force obtained through a power distribution, the fuel supplied from the common rail 20 is directly injected from each hole into the combustion chamber 6. Note that, the fuel injection valve 15 has eight to twelve holes in this embodiment.

At the center of a crown surface (upper surface) of each piston 5 facing the fuel injection valve 15, a cavity 5a concaved downward with respect to another part (a circumferential part) of the crown surface is formed. Therefore, when the fuel is injected from the fuel injection valve 15 in a state where the piston 5 is located near a top dead center (TDC), the fuel enters the cavity 5a first.

Here, a geometric compression ratio of the engine body 1 of this embodiment (a ratio between a combustion chamber volume when the piston 5 is at a bottom dead center (BDC) and a combustion chamber volume when the piston 5 is at the TDC) is set to 14:1. Thus, while geometric compression ratios of in-vehicle diesel engines are generally 18:1 or above, in this embodiment, the geometric compression ratio is set as significantly low as 14:1.

The cylinder block 3 and the cylinder head 4 are formed therein with a water jacket (arranged outside the range of FIG. 1) where a coolant flows, and a water temperature sensor SW1 for detecting a temperature of the coolant inside the water jacket is formed in the cylinder block 3.

Further, a crank angle sensor SW2 for detecting a rotational angle and a rotational speed of the crankshaft 7 is provided in the cylinder block 3. The crank angle sensor SW2 outputs a pulse signal corresponding to the rotation of a crank plate 25 that rotates integrally with the crankshaft 7.

Specifically, multiple teeth aligned via a fixed pitch are convexly arranged in an outer circumferential part of the crank plate 25, and a tooth-lacking part 25a (the part with no tooth), for identifying a reference position, is formed in a predetermined area of the outer circumferential part. Further, the crank plate 25 having the tooth-lacking part 25a at the reference position rotates and the pulse signal based thereon is outputted from the crank angle sensor SW2, and thus, the rotational angle (crank angle) and the rotational speed of the crankshaft 7 (engine speed) are detected.

On the other hand, the cylinder head 4 is provided with a cam angle sensor SW3 for detecting an angle of the camshaft for valve operation (not illustrated). The cam angle sensor SW3 outputs a pulse signal for cylinder determination corresponding to the transit of teeth of a signal plate for rotating integrally with the camshaft.

In other words, although the pulse signal outputted from the crank angle sensor SW2 includes a no-signal portion generated every 360°CA corresponding to the tooth-lacking part 25a, only with the information obtained from the no-signal portion, for example, while the piston 5 rises, the corresponding cylinder and the corresponding stroke between the compression stroke and exhaust stroke cannot be determined. Therefore, the pulse signal is outputted from the cam angle sensor SW3 based on the rotation of the camshaft that rotates once every 720°CA, and based on a timing of the signal output and a timing of the no-signal portion output from the crank angle sensor SW2 (transit timing of the tooth-lacking part 25a), the cylinder determination is performed.

The intake and exhaust ports 9 and 10 are connected with intake and exhaust passages 28 and 29, respectively. Thus, intake air (fresh air) from outside is supplied to the combustion chamber 6 via the intake passage 28 and exhaust gas (combusted gas) generated in the combustion chamber 6 is discharged outside via the exhaust passage 29.

In the intake passage 28, a section with a predetermined length from the engine body 1 toward upstream is defined as a branched passage parts 28a respectively branched for each of the cylinders 2A to 2D, and upstream ends of the branched passage parts 28a are connected with a serge tank 28b. A single common passage part 28c is formed upstream of the serge tank 28b.

The common passage part 28c is provided with an intake throttle valve 30 for adjusting an air amount (intake air amount) to flow into the cylinders 2A to 2D. The intake throttle valve 30 is basically kept fully opened or close to fully opened while the engine is in operation, and is closed to isolate the intake passage 28 only as needed to stop the engine, for example.

An airflow sensor SW4 for detecting an intake air flow rate is provided to the common passage 28c between the common passage 28c and the serge tank 28b.

The crankshaft 7 is coupled to an alternator 32 via, for example, a belt. The alternator 32 is built therein with a regulator circuit for controlling a current of a feed coil (arranged outside the range of FIG. 1) to adjust a power generation amount and obtaining a driving force from the crankshaft 7 to generate a power based on a target value of the power generation amount (target power generating current) determined based on, for example, an electrical load of the vehicle and a remaining level of a battery.

The cylinder block 3 is provided with a starter motor 34 for starting the engine. The starter motor 34 includes a motor body 34a and a pinion gear 34b rotatably driven by the motor body 34a. The pinion gear 34b is detachably matched with a ring gear 35 coupled to an end of the crankshaft 7. When starting the engine by the starter motor 34, the pinion gear 34b moves to a predetermined matching position to match with the ring gear 35 and a rotational force of the pinion gear 34b is transmitted to the ring gear 35, and, thereby, the crankshaft 7 is rotationally driven.

(2) Control System

Each component of the engine configured as above is controlled overall by an ECU 50 (electronic control unit). The ECU 50 is a micro processor constituted with, for example, a CPU, ROM, and RAM.

The ECU 50 is inputted with various information from the various sensors. In other words, the ECU 50 is electrically connected with the water temperature sensor SW1, the crank angle sensor SW2, the cam angle sensor SW3, and the airflow sensor SW4 that are provided in parts of the engine, respectively. The ECU 50 acquires various information, including the temperature of the coolant of the engine, the crank angle, the engine speed, cylinder determination information, and the intake air flow rate, based on the input signals from the sensors SW1 to SW4.

Further, the ECU 50 is also inputted with information from various sensors (SW5 to SW9) provided to the vehicle. In other words, the vehicle is provided with an atmospheric pressure sensor SW5 for detecting an atmospheric pressure, an accelerator position sensor SW6 for detecting an opening of an acceleration pedal 36 operated by being pressed by a driver, a brake sensor SW7 for detecting whether a brake pedal 37 is ON/OFF (the application of the brake), a vehicle speed sensor SW8 for detecting a traveling speed of the vehicle (vehicle speed), and a battery sensor SW9 for detecting the remaining level of the battery (not illustrated). The ECU 50 acquires the information including the accelerator opening, the application of the brake, the vehicle speed, and the remaining level of the battery, based on the input signals from the sensors SW5 to SW9.

The ECU 50 controls the components of the engine respectively while performing various calculations based on the inputted signals from the sensors SW1 to SW9. Specifically, the ECU 50 is electrically connected with the fuel injection valve 15, the intake throttle valve 30, the alternator 32, and the starter motor 34, and outputs drive control signals to these components, respectively, based on the results of the calculations.

Next, the further specific function of the ECU 50 is described. In normal operation of the engine, the ECU 50 has basic functions, such as, injecting from the fuel injection valve 15 a required amount of fuel determined and based on operating conditions, and generating a required amount of power determined and based on, for example, the electrical load on the vehicle and the remaining level of the battery by the alternator 32. The ECU 50 also has a so-called idle stop function for automatically stopping the engine and restarting the engine under predetermined conditions. Therefore, the ECU 50 has an automatic stop controller 51 and a restart controller 52 to serve as functional elements regarding the automatic stop and restart controls of the engine.

During the operation of the engine, the automatic stop controller 51 determines whether the predetermined automatic stop conditions of the engine is satisfied, and when they are satisfied, the automatic stop controller 51 automatically stops the engine.

For example, when a plurality of requirements, such as if the vehicle is stopped, are all met and the engine is confirmed to have disadvantage in stopping, it is determined that the automatic stop condition is satisfied. Thus, the engine is stopped by stopping the fuel injection from the fuel injection valve 15 (fuel cut), etc.

After the engine is automatically stopped, the restart controller 52 determines whether the restart condition is satisfied, and when it is satisfied, the restart controller 52 restarts the engine.

For example, when the engine is required to be started, such as when the driver presses the acceleration pedal 36, the restart condition is determined to be satisfied. Thus, by restarting the fuel injection from the fuel injection valve 15 while applying the rotational force on the crankshaft 7 by driving the starter motor 34, the restart controller 52 restarts the engine.

(3) Automatic Stop Control

Figure 2:
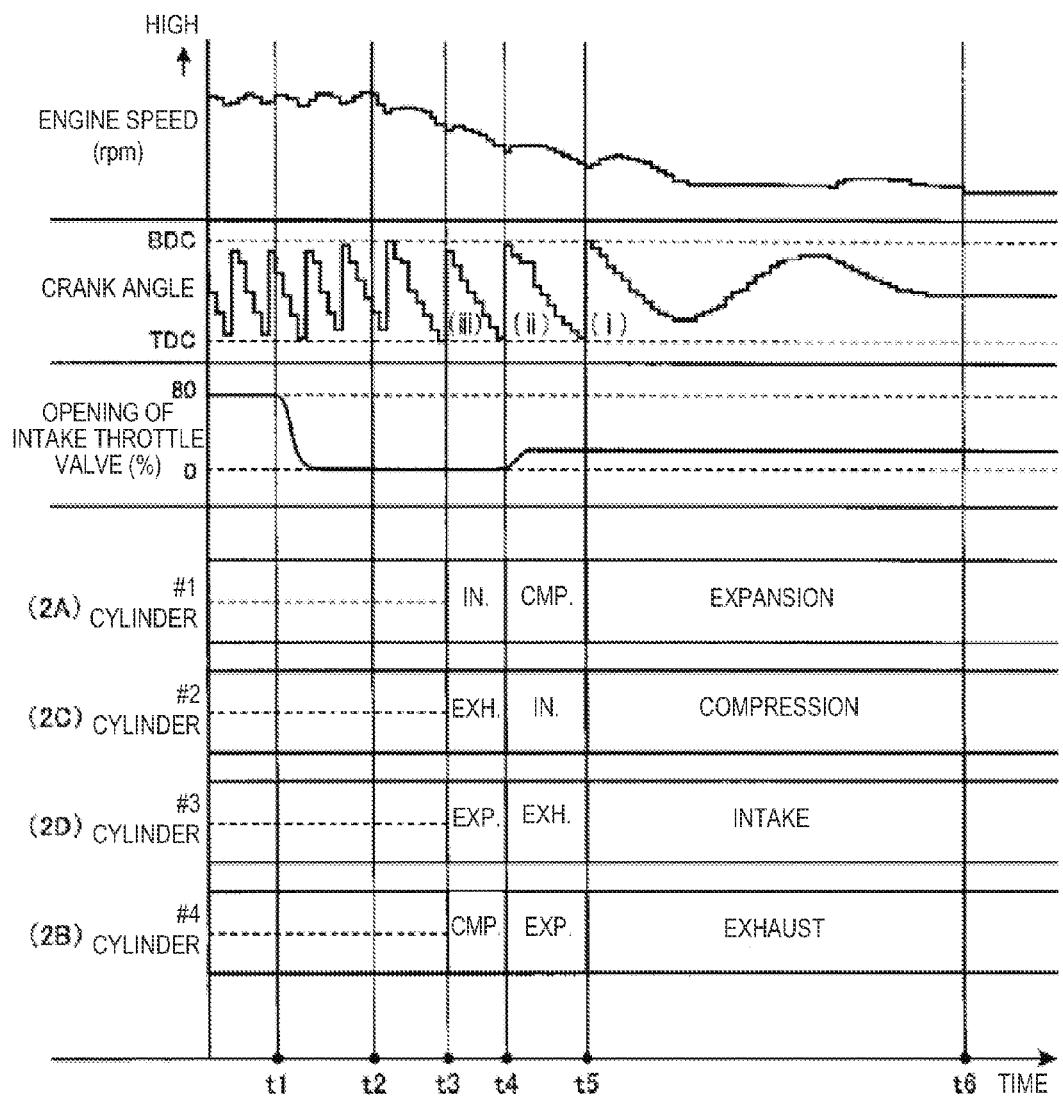
FIG. 2 is a time chart illustrating changes of state quantities in an engine automatic stop control.

Next, the contents of the engine automatic stop control performed by the automatic stop controller 51 of the ECU 50 are further specifically described. FIG. 2 is a time chart showing changes of state amounts in the engine automatic stop control. In FIG. 2, a time point at which the engine automatic stop condition is satisfied is indicated as t1.

As shown in FIG. 2, in the engine automatic stop control, first, the opening of the intake throttle valve 30 is operated in a close direction at the time point t1 at which the engine automatic stop condition is satisfied, and then the opening is reduced from an opening for a normal engine operation set before the automatic stop condition is satisfied (80% in FIG. 2) to a fully closed state (0%) ultimately. Then at a time point t2, the control of stopping the fuel injection from the fuel injection valve 15 (fuel cut) is performed while the opening of the intake throttle valve 30 is in the fully closed state.

Next, after the fuel cut, while the engine speed gradually decreases, the intake throttle valve 30 is again opened. Specifically, when the TDC which one of the cylinders 2A to 2D passes the last immediately before the engine stop is defined as the final TDC, the intake threshold valve 30 is operated in an open direction to have a predetermined opening above 0% (e.g., 10-30%) when the cylinder passes an immediate previous TDC of the final TDC (at a time point t4).

Then, after the final TDC at the time point t5, although the engine reverses by the backlash of the piston, the engine completely stops at a time point t6 without passing the TDC again.

Figure 3:
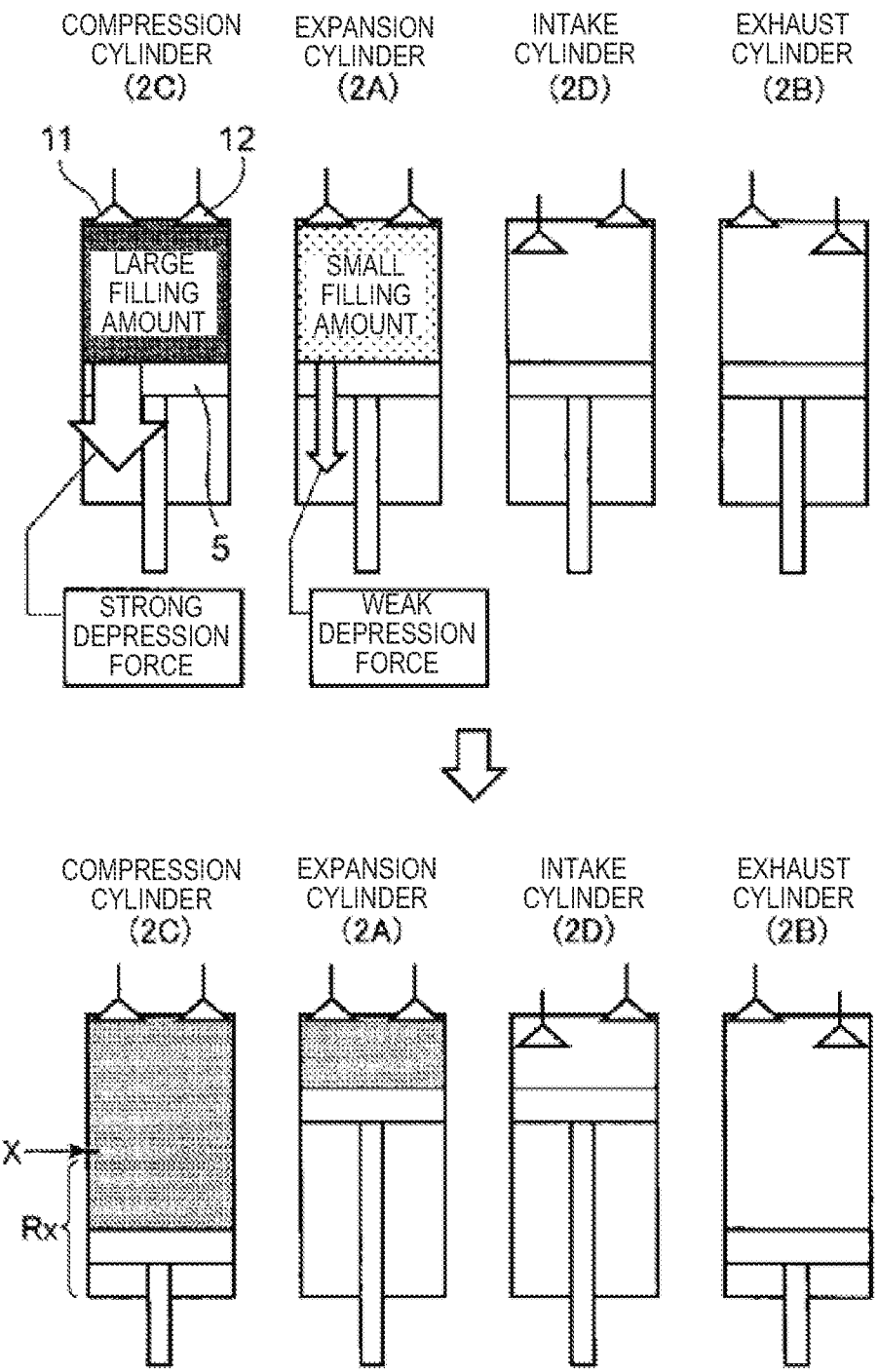
FIG. 3 illustrates views showing operations by the engine automatic stop control, in which the upper view illustrates positions of pistons of cylinders immediately before the engine stops, and the lower view illustrates positions of the pistons of the cylinders after the engine completely stops.

Here, the control of opening the intake throttle valve 30 as above is performed to settle, as illustrated in the lower view of FIG. 3, a piston stop position of the cylinder that is on the compression stroke when the engine completely stops (compression-stroke-in-stop cylinder: the third cylinder 2C in FIG. 2) within a specific range Rx set on the BDC side of a reference stop position X located between the TDC and the BDC as much as possible. Note that, the reference stop position X may differ depending on a shape of the engine (e.g., exhaust amount and bore/stroke ratio) or a warm-up stage, and can be set to any position between 90 and 75°CA before the top dead center (BTDC), etc. For example, when the reference stop position X is at 80°CA BTDC, the specific range Rx corresponds to a range between 80 and 180°CA BTDC.

If the piston 5 of the compression-stroke-in-stop cylinder 2C stops within the specific range Rx, when the engine restart condition is satisfied thereafter, the engine can promptly be restarted by a first compression start in which a first fuel injection in the restart (in the engine overall) is performed to the compression-stroke-in-stop cylinder 2C. On the other hand, if the piston stop position of the compression-stroke-in-stop cylinder 2C is outside the specific range Rx, the engine is required to be restarted by a second compression start in which the fuel is injected into the cylinder that shifts to the compression stroke next to the compression-stroke-in-stop cylinder 2C, in other words, the intake-stroke-in-stop cylinder (the cylinder that is on the intake stroke while the engine is stopped: the fourth cylinder 2D in FIG. 2). The first and second compression starts are selectively performed based on the piston stop position because the ignitability of the compression-stroke-in-stop cylinder 2C changes based on the piston stop position (described in detail later in "(4) Restart Control").

Regarding promptness in the start, because the fuel cannot be combusted until the intake-stroke-in-stop cylinder 2D shifts to the compression stroke in the second compression start, the first compression start is comparatively advantageous. Therefore, to enable to perform the first compression starts highly frequently, the piston stop position of the compression-stroke-in-stop cylinder 2C is required to remain within the specific range Rx as much as possible. Thus, in this embodiment, as illustrated in FIG. 2, the intake throttle valve 30 is opened at the time point t4. In other words, according to the control illustrated in FIG. 2, the opening of the intake throttle valve 30 is set to 0% until the immediate previous TDC (ii) of the final TDC (i.e., until the time point t4), and after the immediate previous TDC (ii) of the final TDC (i.e., after the time point t4), and the opening of the intake throttle valve 30 is increased to a predetermined opening above 0%. In this manner, the intake air flow amount for the compression-stroke-in-stop cylinder 2C that shifts to the intake stroke from the immediate previous TDC (ii) of the final TDC (that is on the intake stroke between the time points t4 and t5) increases to above the intake air flow amount for the cylinder that shifts to the intake stroke from a second previous TDC of the final TDC (that is on the intake stroke between the time points t3 and t4), in other words, the cylinder that is on the expansion stroke when the engine is completely stopped (expansion-stroke-in-stop cylinder: the first cylinder 2A in FIG. 2).

In this regard, a further detailed description is given using the views in FIG. 3 as follows. As described above, when the intake threshold valve 30 is opened when passing the immediate previous TDC (ii) of the final TDC, the intake air amount for the compression-stroke-in-stop cylinder 2C increases to above the intake air amount for the expansion-stroke-in-stop cylinder 2A immediately before the engine automatic stop. In this manner, as illustrated in the upper view of FIG. 3, a depression force by compression air that acts on the piston 5 of the compression-stroke-in-stop cylinder 2C increases, while a depression force by compression air that acts on the piston 5 of the expansion-stroke-in-stop cylinder 2A reduces. Therefore, when the engine is completely stopped, as illustrated in the lower view of FIG. 3, the stop position of the piston 5 of the compression-stroke-in-stop cylinder 2C naturally becomes relatively on the BDC side (the stop position of the piston 5 of the expansion-stroke-in-stop cylinder 2A becomes relatively on the TDC side). As a result, the piston 5 of the compression-stroke-in-stop cylinder 2C can be stopped within the specific range Rx on the BDC side of the reference stop position X at comparatively high frequency. If the piston 5 is stopped within the specific range Rx, when restarting the engine, the engine can be promptly restarted by the first compression start in which the fuel is injected into the compression-stroke-in-stop cylinder 2C.

Next, one example of control operation of the automatic stop controller 51 controlling the engine automatic stop as described above is described with reference to the flowchart in FIG. 4. When the process shown in the flowchart in FIG. 4 starts, the automatic stop controller 51 executes a control of reading various sensor values (Step S1). Specifically, the automatic stop controller 51 reads the detection signals from the water temperature sensor SW1, the crank angle sensor SW2, the cam angle sensor SW3, the airflow sensor SW4, the atmospheric pressure sensor SW5, the accelerator position sensor SW6, the brake sensor SW7, the vehicle speed sensor SW8, and the battery sensor SW9, and based on these signals, it acquires various information, such as the coolant temperature of the engine, the crank angle, the engine speed, the cylinder determination information, the intake air flow rate, the atmospheric pressure, the acceleration opening, the application of the brake, the vehicle speed, and the remaining level of the battery.

Next, based on the information acquired at Step S1, the automatic stop controller 51 determines whether the automatic stop condition of the engine is satisfied (Step S2). For example, the automatic stop condition of the engine is determined to be satisfied when a plurality of requirements, such as the vehicle is in a stop state, the opening of the acceleration pedal 36 is zero (accelerator OFF), the brake pedal 37 is pressed by over a predetermined force (brake ON), the coolant temperature of the engine is above the predetermined value, and the remaining level of the battery is above a predetermined value, are all satisfied. Note that, in the requirement that the vehicle is in the stop state, it is not necessary for the vehicle to be completely stopped (vehicle speed=0 km/h), and it may be below a low vehicle speed (e.g., below 3 km/h).

When it is confirmed that the automatic stop condition is satisfied (Step S2: YES), the automatic stop controller 51 executes a control of setting the opening of the intake throttle valve 30 to be the fully closed state (0%) (Step S3). In other words, as shown in the time chart in FIG. 2, at the time point t1 at which the automatic stop condition is satisfied, the opening of the intake throttle valve 30 starts to be operated in the close direction until it is fully closed (0%) ultimately.

Subsequently, the automatic stop controller 51 executes a fuel cut in which the fuel supply from the fuel injection valve 15 is stopped (Step S4). Thus, at the time point t2 after the automatic stop condition is satisfied (FIG. 2), all the operation signals for the fuel injection valves 15 of the cylinders 2A to 2D are shut to keep each valve body of the fuel injection valve 15 at a close position, and thereby, the fuel cut is executed.

Next, the automatic stop controller 51 determines whether the value of the engine speed when the piston 5 of any one of the four cylinders 2A to 2D reaches the TDC (engine TDC speed) is within a predetermined speed range (Step S5). Note that, as shown in FIG. 2, the engine speed gradually drops while repeating temporal deceleration every time one of the four cylinders 2A to 2D reaches the compression TDC (the TDC between the compression stroke and the expansion stroke) and temporal acceleration after every compression TDC. Therefore, the engine TDC speed can be measured as the engine speed at a timing at which the engine speed starts to accelerate after the deceleration.

The determination relating to the engine TDC speed at Step S5 is performed to specify the timing (time point t4 in FIG. 2) of passing the immediate previous TDC of the final TDC. In other words, in the engine automatic stop, because the deceleration of the engine speed has a certain flow, by checking the engine TDC speed when passing the TDC, the preceding number of the checked TDC of the final TDC can be estimated. Thus, by measuring the engine TDC speed constantly and determining whether the measured engine TDC speed is within a predetermined range obtained as a range of the engine speed when the piston passes the immediate previous TDC of the final TDC in advance through, for example, an experiment, the timing of passing the immediate previous TDC of the final TDC is specified.

When the current time point is confirmed to be the timing (the time point t4 in FIG. 2) of passing the immediate previous TDC of the final TDC (Step S5: YES), the automatic stop controller 51 executes a control of starting to open the intake throttle valve 30 in the open direction until it reaches a predetermined opening above 0% (e.g., between 10 and 30%)

(Step S6). In this manner, the intake air flow amount for the compression-stroke-in-stop cylinder 2C that shifts to the intake stroke at the time point t4 increases to above the intake air flow amount for the expansion-stroke-in-stop cylinder 2A of which the immediate previous stroke of the current stroke is the intake stroke (between the time points t3 and t4).

Further, the automatic stop controller 51 determines whether the engine speed is 0 rpm to determine whether the engine is completely stopped (Step S7). If the engine is completely stopped, the automatic stop controller 51 sets the opening of the intake throttle valve 30 to a predetermined opening (e.g., 80%) which is set in the normal operation. Then, the automatic stop control finishes.

As above, in the automatic stop control, because the intake air flow amount is different between the compression-stroke-in-stop cylinder 2C and the expansion-stroke-in-stop cylinder 2A due to the control at Step S6 in which the intake threshold valve 30 is opened when the piston passes the immediate previous TDC of the final TDC (at the time point t4), when the engine is completely stopped, the piston 5 of the compression-stroke-in-stop cylinder 2C settles within the specific range Rx relatively on the BDC side at comparatively high frequency (the lower view in FIG. 3).

(4) Restart Control

Next, specific contents of the restart control of the engine executed by the restart controller 52 of the ECU 50 is described with reference to the flowchart in FIG. 5. Note that, as will be clear from the following description, in this embodiment, the restart controller 52 of the ECU 50 functions as a determining module for determining whether the piston 5 of the compression-stroke-in-stop cylinder 2C is within the specific range Rx, an injection control module for injecting the fuel when restarting the engine, and an in-cylinder pressure estimating module for estimating an in-cylinder pressure when the piston 5 of the compression-stroke-in-stop cylinder 2C reaches the compression TDC (i.e., the first compression TDC in the restart).

Figure 5:
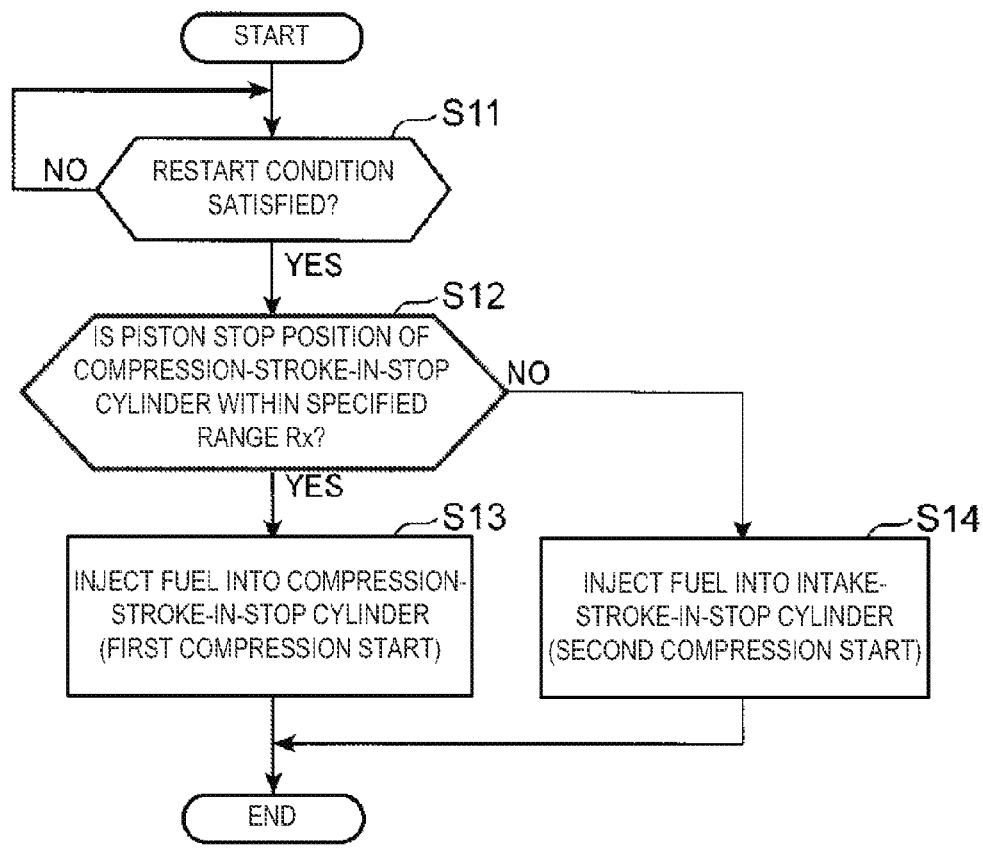
FIG. 5 is a flowchart illustrating one example of a specific operation of an engine restart control.

When the processing shown in the flowchart in FIG. 5 starts, the restart controller 52 determines whether the restart condition of the engine is satisfied based on the various sensor values (Step S11). For example, the restart condition of the engine is determined to be satisfied when at least one of the requirements, including that the acceleration pedal 36 is pressed to start the vehicle (accelerator ON), the coolant temperature of the engine is below a predetermined value, a reduced amount of the remaining level of the battery is above an allowable value, a stopped time period of the engine (elapsed time period after the automatic stop) exceeds a predetermined time length is satisfied.

When it is confirmed that the restart condition is satisfied (Step S11: YES), the restart controller 52 specifies the piston stop position of the compression-stroke-in-stop cylinder 2C that is stopped on the compression stroke according to the engine automatic stop control, based on the values obtained from the crank angle sensor SW2 and the cam angle sensor SW3. The restart controller 52 further determines whether the specified piston stop position is within the specific range Rx on the BDC side of the reference stop position X (the lower view in FIG. 3) (Step S12).

When the piston stop position of the compression-stroke-in-stop cylinder 2C is confirmed to be within the specific range Rx (Step S12: YES), the restart controller 52 executes the control of restarting the engine by the first compression start in which the fuel is injected into the compression-stroke-in-stop cylinder 2C first (Step S13). In other words, by injecting the fuel into the compression-stroke-in-stop cylinder 2C for self-ignition from the fuel injection valve 15 while driving the starter motor 34 to apply the rotational force to the crankshaft 7, the combustion restarts when the engine overall reaches the compression TDC for the first time in the restart (hereinafter, referred to as "the first compression TDC"), and the engine is restarted.

Figure 4:
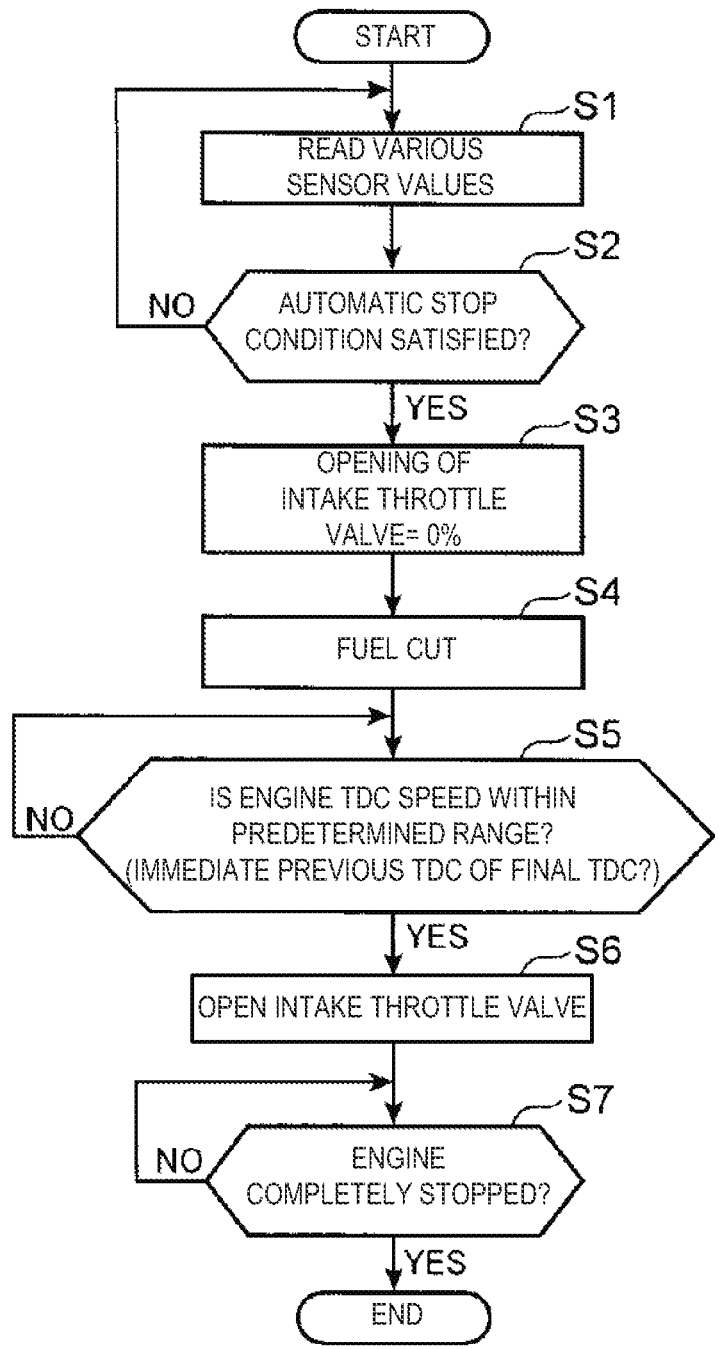
FIG. 4 is a flowchart illustrating one example of a specific operation of the engine automatic stop control.

Here, the piston stop position of the compression-stroke-in-stop cylinder 2C is considered to be within the specific range Rx in relatively many cases due to the effect of the automatic stop control (FIGS. 2 and 4). However, in some cases, the piston stop position may be outside the specific range Rx (the piston 5 stops on the TDC side of the reference stop position X, Step S12: NO).

When the piston 5 of the compression-stroke-in-stop cylinder 2C is stopped on the TDC side of the specific range Rx (Step S12: NO), the restart controller 52 executes the control of restarting the engine by the second compression start in which the fuel is injected into the intake-stroke-in-stop cylinder 2D first, which is stopped on the intake stroke (Step S14). In other words, the engine is forcibly operated only by the starter motor 34 without injecting the fuel within a period from the piston 5 of the compression-stroke-in-stop cylinder 2C crosses the TDC until the intake-stroke-in-stop cylinder 2D shifts to the compression stroke. Further, the fuel is injected into the intake-stroke-in-stop cylinder 2D from the fuel injection valve 15 when the intake-stroke-in-stop cylinder 2D shifts to the compression stroke, the injected fuel self-ignites, and thus, the combustion restarts when the engine overall reaches the compression TDC the second time in the restart, and the engine is restarted.

As above, in the restart control of FIG. 5, the first compression start (S13) and the second compression start (S14) are selectively performed according to the piston stop position of the compression-stroke-in-stop cylinder 2C. Hereinafter, features of the first and second compression starts are described in comparison to each other.

As illustrated in the lower view of FIG. 3, the specific range Rx is set on the BDC side of the predetermined reference stop position X (e.g., any position between 90 and 75°CA BTDC). If the piston 5 of the compression-stroke-in-stop cylinder 2C is stopped within such a specific range Rx on the BDC side, the compression margin (stroke amount to the TDC) of the piston 5 is large and, thus, the air inside the cylinder 2C is sufficiently compressed to be increased in its temperature and pressure due to the rise of the piston 5 when restarting the engine. Therefore, by injecting the fuel into the compression-stroke-in-stop cylinder 2C first in the engine restart, the fuel comparatively easily self-ignites inside the cylinder 2C and combusts (first compression start).

On the other hand, if the piston 5 of the compression-stroke-in-stop cylinder 2C is on the TDC side outside the specific range Rx, the compression margin of the piston 5 is small and the air inside the cylinder is not sufficiently increased in temperature and pressure even when the piston 5 reaches the TDC. Therefore, a misfire may be caused even if the fuel is injected into the compression-stroke-in-stop cylinder 2C. Thus, in this case, the fuel is injected into the intake-stroke-in-stop cylinder 2D instead of the compression-stroke-in-stop cylinder 2C for self-ignition, and thereby, the engine is restarted (second compression start).

However, in the second compression start, the combustion based on the fuel injection cannot be performed until the piston 5 of the intake-stroke-in-stop cylinder 2D reaches near the compression TDC (i.e., until the engine overall reaches the compression TDC the second time in the restart), and it takes long time to restart the engine, in other words, until a complete explosion of the engine (e.g., until the engine speed reaches 750 rpm) from the start of the operation of the starter motor 34. Therefore, when restarting the engine, the engine is preferably restarted by the first compression start.

Thus, in this embodiment, at least when the first compression start is performed at Step S13, a pre-injection is performed by the fuel injection valve 15. The pre-injection is a fuel injection performed preliminary to a main injection that is a fuel injection for diffusion combustion performed near or after the compression TDC. The fuel of the pre-injection is used to surely cause the diffusion combustion generated mainly after the compression TDC based on the main injection (hereinafter, this diffusion combustion is referred to as "the main combustion"). Thus, a small amount of fuel is injected by the pre-injection before the main injection and the injected fuel is combusted after a predetermined ignition retarded period of time (hereinafter, the retarded combustion is referred to as "the pre-combustion"), and thereby, the in-cylinder temperature and pressure are increased to promote the following main combustion.

By performing the pre-injection on the compression-stroke-in-stop cylinder 2C, the in-cylinder temperature and pressure can intentionally be increased near the compression TDC. Therefore, even if the piston stop position of the compression-stroke-in-stop cylinder 2C is closer to the TDC to some extent, the engine can surely be restarted by the first compression start. The reference stop position X serving as the border with the specific range Rx is set taking the improvement in ignitability by the pre-injection into consideration. In other words, if the per-injection is not performed, the reference stop position X needs to be set on the BDC side compared to the case in the lower view of FIG. 3; however, by improving the ignitability by the pre-injection, the reference stop position X can be set further on the TDC side, and as a result, the reference stop position X can be set at a position significantly far from the BDC (e.g., any position between 90 and 75°CA BTDC). In this manner, the specific range Rx extends further toward the TDC and, thus, the piston 5 of the compression-stroke-in-stop cylinder 2C settles within the specific range Rx in higher frequency and the opportunity of performing a prompt restart by the first compression start increases.

Here, the pre-injection of this embodiment is performed a plurality of times (specifically, two to five times) within a predetermined crank angle range before the compression TDC. This is because, with the same amount of fuel in total, rich mixture gas can continuously be formed within the cavity 5a formed in the crown surface of the piston 5 and the ignition retarded time period can be shortened by injecting the fuel in the plurality of pre-injection compared to injecting the fuel in a single pre-injection.

Figure 6A:
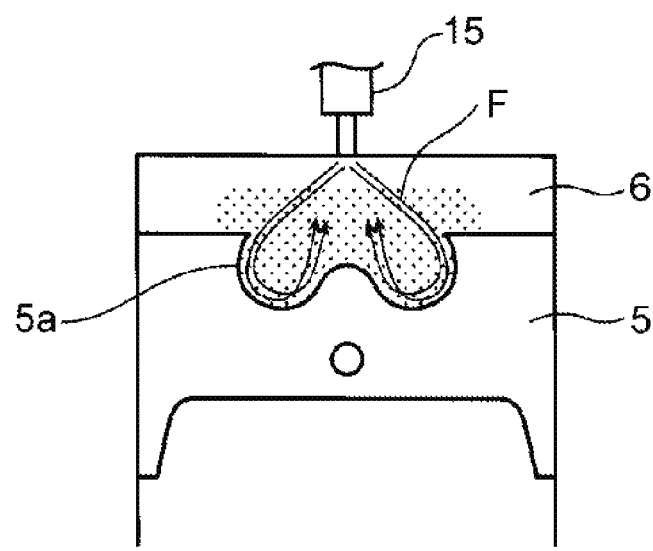
FIG. 6 illustrates views showing behaviors of fuel that is pre-injected when restarting the engine, in which FIG. 6A indicates a case where the pre-injection is performed once, and FIG. 6B indicates a case where a plurality of pre-injections are performed for a plurality of times.
Figure 6B:
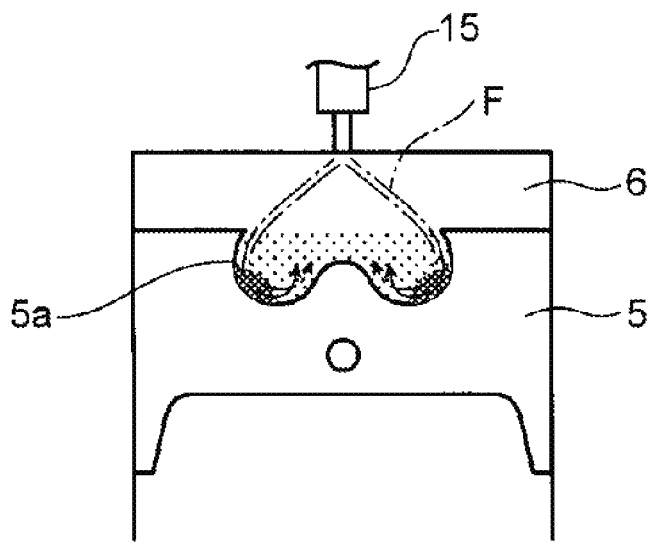

In this regard, a detailed description will be given using FIGS. 6A and 6B. FIGS. 6A and 6B illustrate views showing behaviors of fuel that is pre-injected, within the cavity 5a.

Each pre-injection is performed at such timing before the main injection that the injected fuel falls within the cavity 5a. The timing is between 20 and 0°CA BTDC. FIG. 6A illustrates the case where the pre-injection is performed only once within the crank angle range, and FIG. 6B illustrates the case where the pre-injection is performed for the plurality of times within the crank angle range.

As illustrated in FIG. 6A, when the pre-injection is performed once, because a penetration of a fuel spray F is strong, the fuel spray F spreads within the cavity 5a entirely and further to the outside thereof by flowing back upward along the wall face of the cavity 5a, etc. As a result, a frequency that the rich mixture gas is distributed within the cavity 5a (space frequency) decreases. On the other hand, as illustrated in FIG. 6B, when the pre-injection is performed for the plurality of times, because the injection amount per single pre-injection is small and the penetration of the fuel spray F is weak, a relatively large amount of fuel remains around a bottom area of the cavity 5a (double-hatched part in FIG. 6B). As a result, the frequency at which the rich mixture gas is distributed within the cavity 5a increases.

Figure 7:
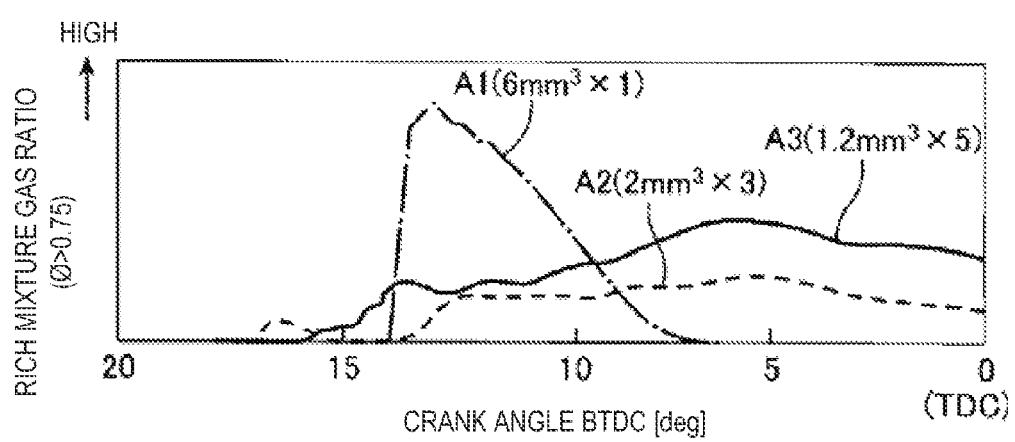
FIG. 7 is a chart illustrating a change of an equivalent ratio inside the cylinder after the pre-injection, based on the number of pre-injections.

FIG. 7 is a chart illustrating a change, when a predetermined amount of fuel is pre-injected by using the fuel injection valve 15 with eight holes, of an equivalent ratio cp after the pre-injection(s). Specifically, in FIG. 7, A1 indicates the change of the equivalent ratio φ after 6 mm$^3$ of fuel is injected at a single timing of 14°CA BTDC, and A2 indicates the change of the equivalent ratio φ after 2 mm$^3$ of fuel is injected at three timings (6 mm$^3$ in total) after 18°CA BTDC, and A3 indicates the change of the equivalent ratio φ after 1.2 mm$^3$ of fuel is injected at five timings (6 mm$^3$ in total) after 18°CA BTDC. Note that, in FIG. 7, the vertical axis indicates a rich mixture gas ratio showing a frequency of the mixture gas in which the equivalent ratio φ>0.75 existing within the cavity 5a, and the lateral axis indicates the crank angle before the compression TDC.

As illustrated in FIG. 7, it can be understood that when the pre-injection is performed once (A1), although the equivalent ratio φ immediately after the injection is large, the equivalent ratio φ cannot be maintained until near the compression TDC at which the main injection is performed. This is because, as described above, the penetration of the fuel spray is excessively strong and the fuel spray flows back upward (toward the cylinder head 4) and spreads. On the other hand, by increasing the number of pre-injections to three and five times (A2 and A3), the penetration of the fuel spray is suppressed, a relatively large amount of fuel remains eccentrically in a specific area within the cavity 5a, and this state lasts comparatively long. As a result, the equivalent ratio φ changes gradually and a large equivalent ratio φ is maintained until near the compression TDC (0°CA BTDC).

Figure 8:
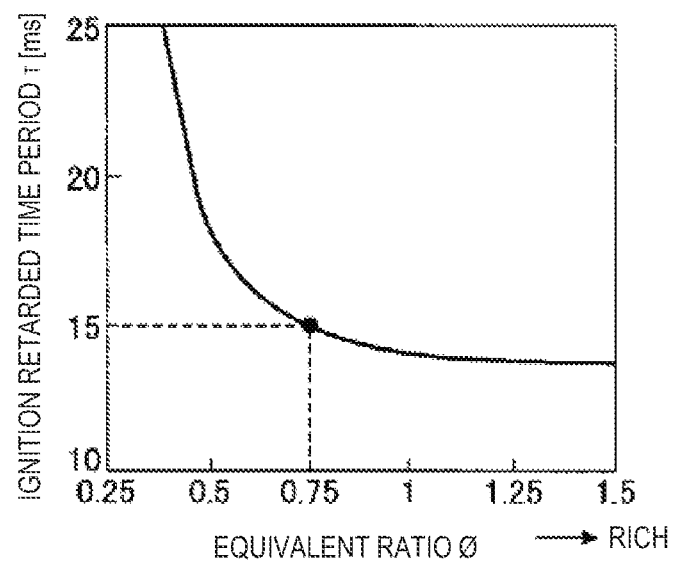
FIG. 8 is a chart illustrating a relation between an equivalent ratio of mixture gas and an ignition retarded time period.

Here, it is generally known that the ignition retarded time period is shorter with a larger equivalent ratio φ of the mixture gas (i.e., richer fuel). FIG. 8 is a chart illustrating a relation between the equivalent ratio φ of the mixture gas and the ignition retarded time period τ. Specifically, the chart indicates a result of calculating, when the fuel is injected at a maximum temperature and under a maximum pressure on an assumption that the air with atmospheric pressure is compressed from the piston position of 75°CA BTDC by the engine speed of 120 rpm, the change of the ignition retarded time period τ with respect to the equivalent ratio φ. Note that, the engine speed of 120 rpm is set as one example of the engine speed when the piston passes the first TDC when restarting the engine (substantially between 100 and 120 rpm).

In FIG. 8, the ignition retarded time period τ is 15 ms when the equivalent ratio φ of the mixture gas is 0.75, for example. When the equivalent ratio φ is below 0.75, the ignition retarded time period τ rapidly extends as the equivalent ratio φ becomes smaller (i.e., as the fuel becomes leaner). On the other hand, when the equivalent ratio φ is above 0.75, although the ignition retarded time period τ is shortened as the equivalent ratio φ becomes larger (i.e., as the fuel becomes richer), the change rate is gradual, and the ignition retarded time period τ does not change greatly even when the equivalent ratio φ is slightly above 0.75 (e.g., even when φ=1, τ is only shortened by 1 ms with respect to when φ=0.75).

Thus, for example, even when the compression starts from such a piston position around the reference stop position X in the lower view of FIG. 3 (position significantly far from the BDC), by forming the mixture gas with φ>0.75 before reaching near the compression TDC (see FIG. 7) and keeping the mixture gas for about 15 ms, the mixture gas may ignite. Because 15 ms corresponds to only 10°CA at the engine speed of 120 rpm, when passing the first compression TDC in the restart, the mixture gas ignites with no difficulty near the compression TDC where the in-cylinder temperature and pressure reach their maximum values.

According to the above circumstances, in this embodiment, the pre-injection is performed for the plurality of times instead of once, because, as illustrated in FIG. 7, the rich mixture gas with φ>0.75 can continuously be formed until reaching the compression TDC. Thus, it can be considered that even when the piston 5 of the compression-stroke-in-stop cylinder 2C is at such position far from the BDC, such as near the reference stop position X (i.e., even when the compression margin of the piston 5 is small), the ignitability of the pre-injected fuel is secured and the pre-combustion is surely caused. If the pre-combustion is caused, because the in-cylinder temperature and pressure of the compression-stroke-in-stop cylinder 2C are increased and the fuel of the following main injection easily self-ignites, the first compression start is surely performed.

Figure 9:
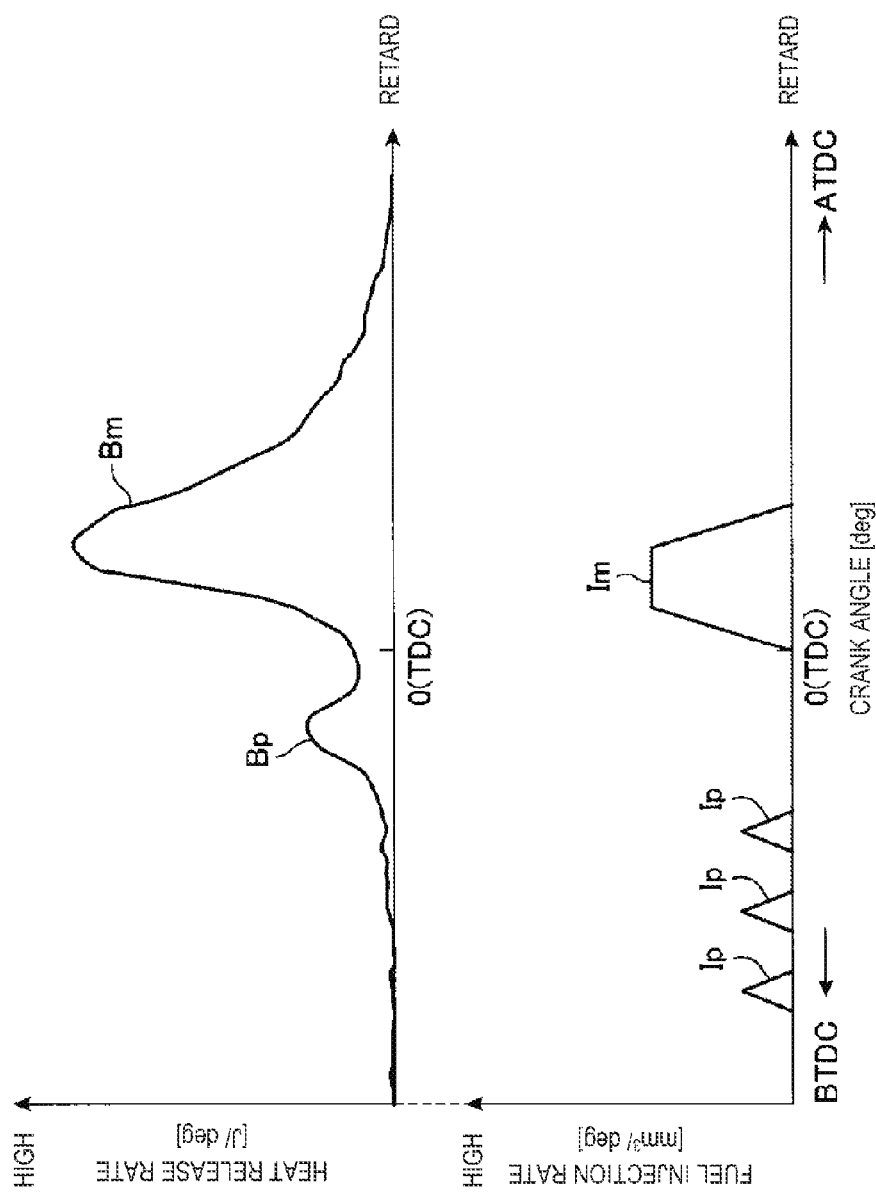
FIG. 9 illustrates charts showing timings at which when the pre-injections and a main injection are performed, the fuel based on the injections combusts, respectively.

FIG. 9 illustrates charts for verifying the effects caused by the pre-injections. Here, as one example, the pre-injection is performed three times, and a change of the fuel injection rate (mm³/deg) is illustrated in the lower chart, and a change of a heat release rate (J/deg) is illustrated in the upper chart. Specifically, between 18 and 10°CA BTDC, 2 mm³ of fuel is injected three times as the pre-injections (the waveform Ip in the lower chart), and then, as the main injection, a larger amount of fuel than the pre-injections (at least larger than the amount of single pre-injection) is injected at the compression TDC (0°CA BTDC) (the waveform Im in the lower chart). Moreover, the combustions caused by such fuel injections are illustrated as the change of the heat release rate (the waveforms Bp and Bm in the upper chart).

As illustrated in FIG. 9, when the three pre-injections (Ip) are performed, after the final pre-injection is completed, the pre-combustion (Bp) caused by the self-ignition of the pre-injected fuel after the predetermined ignition retarded time period. The pre-combustion (Bp) is caused before the compression TDC (0°CA BTDC), and the heat release rate reaches its peak also before the compression TDC. Then, although the heat release rate reduces once, due to the start of the main injection (Im) at the compression TDC, the main combustion (Bm) caused by the self-ignition of the main-injected fuel subsequently occurs. Based on the main injection (Im) performed in the state where the in-cylinder temperature and pressure were increased by the pre-combustion (Bp), the main combustion (Bm) (diffusion combustion) starts with almost no ignition retard.

Moreover, in FIG. 9, the pre-combustion and the main combustion are separated by a trough area of the heat release rate, and the combustions are independent from each other. In other words, in this embodiment, it can be understood that the pre-combustion (Bp) is for improving the in-cylinder environment of the compression-stroke-in-stop cylinder 2C to be advantageous in self-ignition (i.e., increase the in-cylinder temperature and pressure near the compression TDC) and is not for generating a torque to start the engine as in the main combustion.

Next, a method of determining the number of pre-injections is described. When the restart condition is satisfied and the restart of the engine starts, the restart controller 52 of the ECU 50 estimates a substantial value of the in-cylinder pressure of the compression-stroke-in-stop cylinder 2C when the piston 5 of the compression-stroke-in-stop cylinder 2C that is stopped on the compression stroke reaches the compression TDC, and, based on the estimated in-cylinder pressure, the restart controller 52 determines the number of pre-injections. Note that, the compression TDC that the piston 5 of the compression-stroke-in-stop cylinder 2C reaches after the start of the restart is the first compression TDC in the engine overall. Hereinafter, the in-cylinder pressure of the compression-stroke-in-stop cylinder 2C is referred to as "the in-cylinder pressure at the first compression TDC."

Figure 10A:
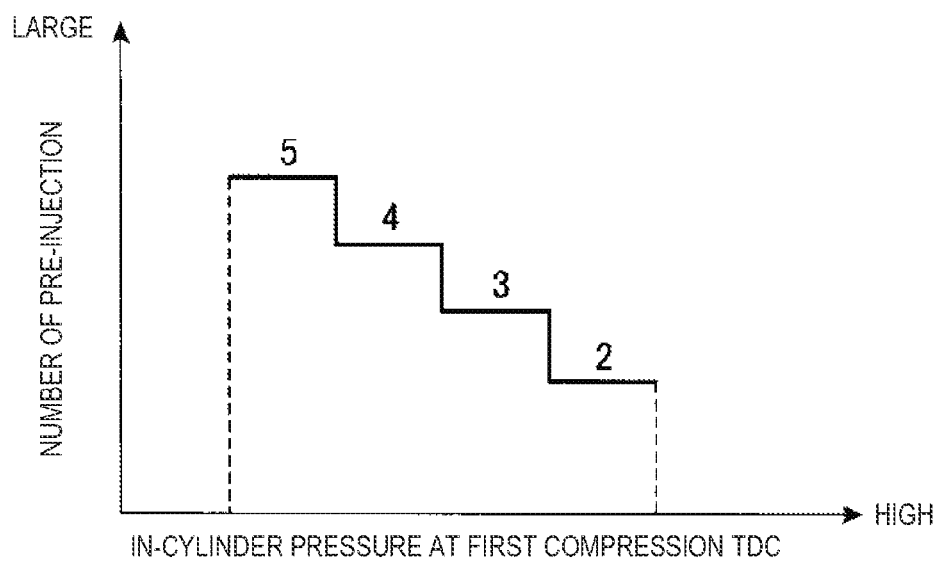
FIG. 10 illustrates charts showing the number of pre-injections and an injection amount, in which FIG. 10A indicates a relation between an in-cylinder pressure and the number of pre-injections at a first compression TDC, and FIG. 10B indicates a relation between the in-cylinder pressure and the injection amount of a single pre-injection at the first compression TDC.

Specifically, the number of pre-injections is set larger as the estimated in-cylinder pressure at the first compression TDC is lower, and in this embodiment, as illustrated in FIG. 10A, it is set to any of between two to five according to the in-cylinder pressure at the first compression TDC. For example, for the lowest in-cylinder pressure at the first compression TDC, the number of pre-injections is set to five, and for the highest in-cylinder pressure at the first compression TDC, the number of pre-injections is set to two.

Figure 10B:
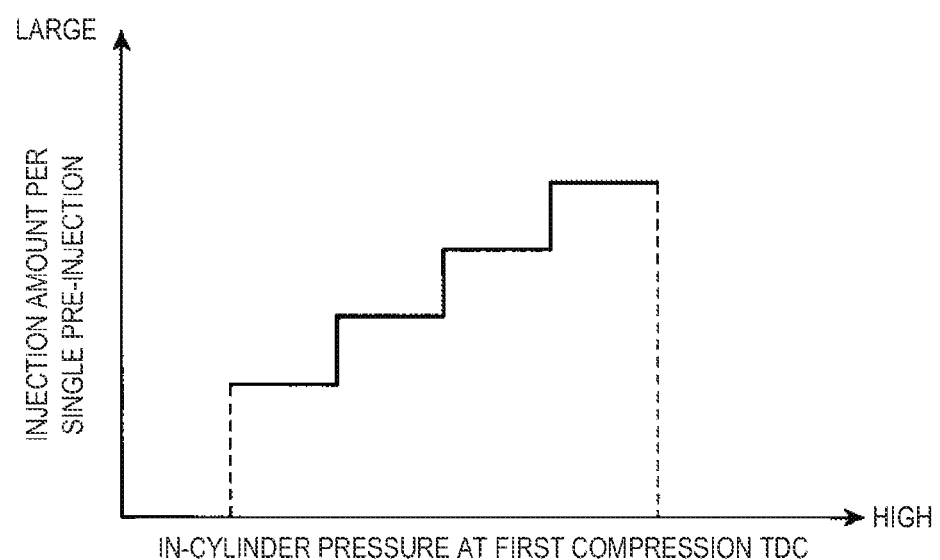

Moreover, in this embodiment, the total amount of fuel to be pre-injected is fixed regardless of the number of pre-injections. Therefore, as illustrated in FIG. 10B, the injection amount per single pre-injection is set less as the number of pre-injections is increased. For example, if the injection amount per single pre-injection is 3 mm³ when the number of pre-injections is twice and the total fuel amount of the pre-injections is 6 mm³, the injection amount per single pre-injection is 2 mm³ when the number is three, 1.5 mm³ when the number is four, and 1.2 mm³ when the number is five.

Figure 11:
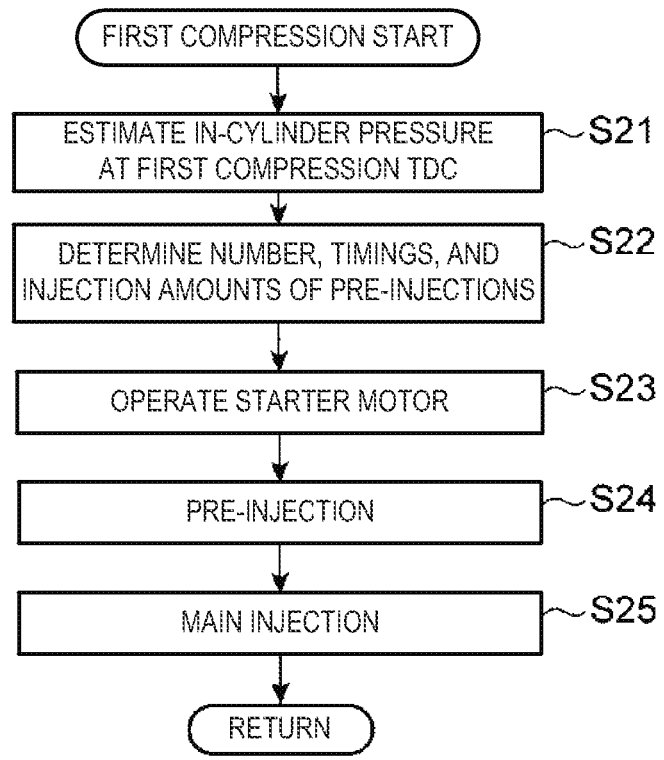
FIG. 11 is a flowchart illustrating one example of a specific operation of the engine restart by a first compression start.

FIG. 11 is a flowchart illustrating specific contents of the control in the first compression start, mainly including the combustion control on the compression-stroke-in-stop 2C as above. As illustrated in FIG. 11, when the engine restart by the first compression start starts (Step S13 in FIG. 5), the restart controller 52 executes a control of estimating the in-cylinder pressure of the compression-stroke-in-stop cylinder 2C when the piston 5 of the cylinder 2C reaches the compression TDC (Step 21).

Specifically, at Step S21, the engine stop time period that is the elapsed time period from when the engine is completely stopped until the restart condition is satisfied is acquired by a counter timer installed in the ECU 50, and the coolant temperature of the engine and the atmospheric pressure when the restart condition is satisfied are acquired from the water temperature sensor SW1 and the atmospheric pressure sensor SW5, respectively. Moreover, the in-cylinder pressure at the first compression TDC is obtained by a calculation based on the engine stop time period, the coolant temperature, and the atmospheric pressure which are acquired here and the piston stop position of the compression-stroke-in-stop cylinder 2C determined at Step S12 in FIG. 5. For example, the in-cylinder pressure at the first compression TDC can be estimated to be higher as the piston stop position of the compression-stroke-in-stop cylinder 2C is closer to the BDC within the specific range Rx. Similarly, the in-cylinder pressure at the first compression TDC can be estimated to be higher as the engine stop time period is shorter and/or as the coolant temperature or the atmospheric pressure is higher. Note that, the in-cylinder pressure is higher as the engine stop time period is shorter because an amount of air that leaks outside the combustion chamber 6 from a gap of a piston ring can be less as the engine stop time period is shorter.

Here, if there is a variation in the remaining level of the battery, it is considered that a rising speed of the piston 5 until it reaches the first compression TDC varies due to a variation in drive force of the starter motor 34 for rotating the crankshaft 7 by receiving a power from the battery, and the in-cylinder pressure at the first compression TDC is influenced.

However, in this embodiment, because the automatic stop condition includes the requirement of the remaining level of the battery being above the predetermined value (i.e., because the engine automatic stop is performed only when the battery has an enough remaining level), the rising speed of the piston 5 reaching the first compression TDC when restarting the engine does not vary greatly and remains within a fixed speed range (e.g., between 100 and 120 rpm). Therefore, in this embodiment, the in-cylinder pressure at the first compression TDC is estimated based only on the piston stop position, the engine stop time period, the coolant temperature, and the atmospheric pressure, without taking the remaining level of the battery into consideration.

After the in-cylinder pressure at the first compression TDC (the in-cylinder pressure when the piston 5 of the compression-stroke-in-stop cylinder 2C reaches the compression TDC) is estimated as described above, the restart controller 52 executes the control of determining the number, the timings, and the injection amounts of the pre-injections based on the estimated in-cylinder pressure (Step S22). In other words, the number of pre-injections is increased as the estimated in-cylinder pressure at the first compression TDC is lower, and it is reduced as the in-cylinder pressure is higher. Moreover, the timing and the injection amount of each per-injection are determined according to the number of pre-injections.

As described above, the number of the pre-injections is selected from two to five, and the timing of each pre-injection is set to a suitable timing before the main injection as well as within the crank angle range within which the fuel can fall within the cavity 5a of the piston 5 (e.g., between 20 and 0°CA BTDC) according to the determined number of the pre-injections. Moreover, the injection amount of each pre-injection is determined as the value obtained by dividing the predetermined total amount by the number of pre-injections.

Subsequently, the restart controller 52 starts the operation of the starter motor 34 (Step S23). In this manner, the engine is forcibly operated and the piston 5 of the compression-stroke-in-stop cylinder 2C moves toward the compression TDC. Moreover, in the process of the rise of the piston, the fuel injection valve 15 is operated and the pre-injections according to the number, the timings, and the injection amounts of the injections determined at Step S22 are performed (Step S24). In this manner, as illustrated in FIG. 9, the pre-combustion (Bp) of which the heat release rate reaches its peak before the compression TDC (0°CA BTDC) is caused and the in-cylinder temperature and pressure can be increased.

Next, the restart controller 52 performs the main injection in which a larger amount of fuel than at least one pre-injection is injected from the fuel injection valve 15 (Step S25). The main injection starts near the compression TDC when the heat release rate of the pre-combustion (Bp) passes its peak to cause the main combustion (Bm) of which the heat release rate reaches its peak after the compression TDC. The combustion energy of the main combustion (Bm) acts to depress the piston 5 after passing the compression TDC, and is used as a torque in a positive direction for increasing the engine speed.

As above, the first combustion control on the compression-stroke-in-stop cylinder 2C in the first combustion start completes. Note that, although it is omitted in FIG. 11, the combustion control based on the pre-injections and the main injection may be performed also on the cylinder shifting to the compression stroke after the compression-stroke-in-stop cylinder 2C as needed. In the restart of the engine, the combustion in the compression-stroke-in-stop cylinder 2C that reaches the first compression TDC has the worst ignitability, and also for the cylinders 2D and 2B that reach the compression TDC for the second time and the third time as the engine overall respectively (the second compression TDC and the third compression TDC), it is considered that the improvement in ignitability is not sufficient. This is because the engine speed is not sufficiently increased either at the second compression TDC or the third compression TDC and, thus, there is a possibility that the temperature and the pressure of the air inside each cylinder do not increase due to the air leakage from the gap of the piston ring or a cooling loss. Thus, in view of surely preventing a misfire, the combustion control based on the pre-injections and the main injection may be performed also on the other cylinders such as the cylinders 2D and 2B (hereinafter, referred to as "the following cylinders").

Note that, because the engine speed is higher at the second compression TDC, the third compression TDC, etc., which the following cylinders reach, than at the first compression TDC which the compression-stroke-in-stop cylinder 2C reaches, the number of pre-injections and the like in the following cylinders are not required to be the same as those of the compression-stroke-in-stop cylinder 2C. For example, it may be considered that when the number of pre-injections in the compression-stroke-in-stop cylinder 2C is as large as four or five, the number of pre-injections in the following cylinders are reduced as proceeding to the second compression TDC, the third compression TDC, etc., and the timing and the injection amount of each pre-injection are adjusted accordingly.

Moreover, such combustion control based on the pre-injections and the main injection is not performed only in the first compression start in which the fuel is injected into the compression-stroke-in-stop cylinder 2C first, but may also be performed similarly in the second compression start in which the fuel is injected into the intake-stroke-in-stop cylinder 2D first (Step S14 in FIG. 5).

(5) Operation and Effect

As described above, in this embodiment, the following characteristic configuration is adopted for the diesel engine having a so-called idle stop function of automatically stopping and restarting the engine under a predetermined condition.

After the engine is automatic stopped, when the restart condition is satisfied, the restart controller 52 of the ECU 50 (engine control unit) determines whether the piston 5 of the compression-stroke-in-stop cylinder 2C stopped on the compression stroke is within the specific range Rx set relatively on the BDC side of the predetermined reference stop position X (the lower view in FIG. 3), when it is within the specific range Rx, the restart controller 52 restarts the engine by injecting the fuel first into the compression-stroke-in-stop cylinder 2C from the fuel injection valve 15 (first compression start). In the first fuel injection to the compression-stroke-in-stop cylinder 2C, for example, as illustrated in FIG. 9, the main injection (Im) for causing the main combustion (Bm) of which the heat release rate reaches its peak after the compression TDC, and the pre-injections (Ip) for causing the pre-combustion (Bp) of which the heat release rate reaches its peak before the start of the main injection are performed. The pre-injection is performed for the plurality of times at such timings that the injected fuel falls within the cavity 5a of the piston 5, and the number of pre-injections and the like are determined based on the estimated value of the in-cylinder pressure at the first compression TDC which the piston 5 of the compression-stroke-in-stop cylinder 2C reaches. Thus, the restart controller 52 estimates the in-cylinder pressure at the first compression TDC, and increases the number of pre-injections and reduces the injection amount per single pre-injection as the estimated in-cylinder pressure is lower.

According to this configuration, after the engine is automatically stopped, in the first compression start in which the engine is restarted by the fuel injections to the compression-stroke-in-stop cylinder 2C, the pre-injections are performed at such timings that the fuel falls within the cavity 5a of the piston 5, and the main injection is performed thereafter. Because, by the pre-injection, comparatively rich mixture gas is formed within the cavity 5a of the piston 5 and the mixture gas self-ignites to combust itself after the predetermined retarded time length (pre-combustion), when the in-cylinder temperature and pressure of the compression-stroke-in-stop cylinder 2C increase and the main injection is performed subsequently, the injected fuel self-ignites to combust itself (main combustion). In the main combustion, because the heat release rate reaches its peak after the compression TDC and it acts to depress the piston 5 after passing the compression TDC, the torque in the positive direction is applied to the engine, and the engine speed is increased.

Thus, the ignitability of the fuel injected in the main injection is improved by the pre-injection (pre-combustion) before the main injection. Therefore, the combustion in the compression-stroke-in-stop cylinder 2C is surely performed even if the compression margin (stroke amount to the TDC) by the compression-stroke-in-stop cylinder 2C is not as large. In this manner, the specific range Rx that is the piston stop position range in which the first compression start is available can be extended toward the TDC. Therefore, the opportunity of performing the first compression start increases and a prompt starting performance can be secured.

Moreover, in this embodiment, the in-cylinder pressure at the first compression TDC is estimated, and the number of pre-injections is increased (the injection amount per single pre-injection is reduced) as the estimated in-cylinder pressure is lower. Therefore, the penetration per single pre-injection can be weakened as the in-cylinder pressure is lower. In this manner, the injection of the fuel with strong penetration even with the low in-cylinder pressure (and an easy fuel diffusion caused thereby) can be avoided. Therefore, the mixture gas that is rich and easily ignites itself can surely be formed within the cavity 5a, and the ignitability of the pre-injected fuel can be secured satisfactorily.

Particularly, when the number of pre-injections is set to be changeable between two and five according to the in-cylinder pressure at the first compression TDC as this embodiment, it is advantageous in that the penetration of the pre-injection can be adjusted in a sufficiently wide range, and the ignitability of the pre-injected fuel can be secured satisfactorily regardless of the in-cylinder pressure.

Note that, in this embodiment, the pre-injection is performed for the plurality of times between two and five at least when the fuel is injected into the compression-stroke-in-stop cylinder 2C first in the restart; however, when the in-cylinder temperature and pressure of the compression-stroke-in-stop cylinder 2C rises up to the compression TDC (at the first compression TDC) is expected to be significantly high, such as when the piston stop position of the compression-stroke-in-stop cylinder 2C is significantly close to the BDC within the specific range Rx or when the restart condition is satisfied immediately after the engine automatic stop (i.e., when the engine stop time period is significantly short), it may be set to perform the pre-injection only once.

Moreover, in this embodiment, the suitable mode of the present invention is described using the diesel engine including the engine body 1 of which the geometric compression ratio is 14:1 as the example; however, needless to say, the geometric compression ratio of the engine to which the configuration of the present invention is applicable is not limited to 14:1. For example, the configuration of the present invention in which the ignitability in the restart is improved by the pre-injection(s) is applicable to a diesel engine of which the geometric compression ratio is 16:1 or below because it has a lower compression ratio and worse ignitability compared to the conventionally used diesel engines. On the other hand, the geometric compression ratio of the diesel engine is considered to require 12:1 or above based on the limit of the ignitability. Thereby, the geometric compression ratio of the diesel engine to which the configuration of the present invention is applicable is between 12:1 and 16:1, and preferably, between 13:1 and 15:1.

Moreover, the diesel engine to which the configuration of the present invention is applicable is not limited to the diesel engine of this embodiment (the engine that combusts the diesel fuel by self-ignition), as long as it is a compression self-ignition engine. For example, recently, engines that compress fuel containing gasoline at a high compression ratio for self-ignition have been studied and developed. The automatic stop and restart controls according to the present invention can suitably be applied also to such compression self-ignition gasoline engines.

DESCRIPTION OF REFERENCE NUMERALS

1 Engine Body
2A-2D Cylinder
5 Piston
5a Cavity
15 Fuel Injection Valve
34 Starter Motor
52 Restart Controller (Determining Module, Injection Control Module, In-cylinder Estimating Module)
X Reference Stop Position
Rx Specific Range
Ip Pre-injection
Im Main Injection
Bp Pre-combustion
Bm Main Combustion

The invention claimed is:

1. A start control device including a compression self-ignition engine, fuel injection valves for injecting fuel into cylinders of the engine respectively, a piston stop position detector for detecting stop positions of pistons, and a starter motor for applying a rotational force to the engine, the engine combusting through self-ignition, the fuel injected into the cylinders by the fuel injection valves, the device automatically stopping the engine when a predetermined automatic stop condition is satisfied, and thereafter, when a predetermined restart condition is satisfied, restarting the engine by injecting the fuel while applying the rotational force to the engine, the device comprising:
a determining module for determining whether a piston of a compression-stroke-in-stop cylinder that is stopped on a compression stroke by automatically stopping is within a specific range set on a bottom dead center side of a predetermined reference stop position;
an injection control module for controlling each of the fuel injection valves to inject the fuel into the compression-stroke-in-stop cylinder first after the piston of the compression-stroke-in-stop cylinder is determined to be stopped within the specific range and the engine restart condition is satisfied; and
an in-cylinder pressure estimating module for estimating an in-cylinder pressure of the compression-stroke-instop cylinder at a first top dead center on the compression stroke in a restart, where the piston of the compression-stroke-in-stop cylinder reaches after the restart starts, wherein each of the pistons is formed with a cavity in a predetermined part of its crown surface facing the fuel injection valve, the cavity being recessed with respect to other parts of the crown surface, wherein the injection control module performs, at least as the first fuel injection to the compression-stroke-in-stop cylinder, a main injection for causing a main combustion so that a heat release rate reaches its peak after the compression TDC, and a pre-injection for causing a pre-combustion so that the heat release rate reaches its peak before the main injection starts, and wherein the pre-injection is performed once or more at such timings that the injected fuel is kept substantially contained within the cavity of the piston, and the number of pre-injections is increased and an injection amount per single pre-injection is set less as the in-cylinder pressure at a first compression TDC is lower.

2. The device of claim 1, wherein the in-cylinder pressure estimating module estimates the in-cylinder pressure at the first compression TDC based on the piston stop position of the compression-stroke-in-stop cylinder, an engine stop period of time that is an elapsed period of time from when the engine is completely stopped until the restart condition is satisfied, a coolant temperature of the engine, and an atmospheric pressure.

3. The device of claim 1, wherein the injection control module changeably sets a number of pre-injections between two and five.

4. The device of claim 2, wherein the injection control module changeably sets a number of pre-injections between two and five.

5. The device of claim 1, wherein the compression self-ignition engine is a diesel engine of which a geometric compression ratio is set between 12:1 and below 16:1.

6. The device of claim 2, wherein the compression self-ignition engine is a diesel engine of which a geometric compression ratio is set between 12:1 and below 16:1.

7. The device of claim 3, wherein the compression self-ignition engine is a diesel engine of which a geometric compression ratio is set between 12:1 and below 16:1.

8. A method of controlling a start of a compression self-ignition engine, including injecting fuel into cylinders of the engine by fuel injection valves, respectively, detecting stop positions of pistons, applying a rotational force to the engine by a starter motor, combusting the engine through self-ignition, the fuel injected into the cylinders by the fuel injection valves, automatically stopping the engine when a predetermined automatic stop condition is satisfied, and thereafter, when a predetermined restart condition is satisfied, restarting the engine by injecting the fuel while applying the rotational force to the engine, the method comprising:

determining whether a piston of a compression-stroke-in-stop cylinder that is stopped on a compression stroke by automatically stopping is within a specific range set on a bottom dead center side of a predetermined reference stop position;

controlling each of the fuel injection valves to inject the fuel into the compression-stroke-in-stop cylinder first after the piston of the compression-stroke-in-stop cylinder is determined to be stopped within the specific range and the engine restart condition is satisfied; and estimating an in-cylinder pressure of the compression-stroke-in-stop cylinder at a first top dead center on the compression stroke in a restart, where the piston of the compression-stroke-in-stop cylinder reaches after the restart starts, wherein each of the pistons is formed with a cavity in a predetermined part of its crown surface facing the fuel injection valve, the cavity being recessed with respect to other parts of the crown surface, wherein controlling each of the fuel injection valves to inject the fuel includes performing, at least as the first fuel injection to the compression-stroke-in-stop cylinder, a main injection for causing a main combustion so that a heat release rate reaches its peak after the compression TDC, and a pre-injection for causing a pre-combustion so that the heat release rate reaches its peak before the main injection starts, and wherein the pre-injection is performed once or more at such timings that the injected fuel is kept substantially contained within the cavity of the piston, and a number of pre-injections is increased and an injection amount per single pre-injection is set to be less as the in-cylinder pressure at the first compression TDC is lower.

* * * * *